C. H. BURROWS.
ROPE MEASURING MACHINE.
APPLICATION FILED FEB. 2, 1920.
1,362,843.
Patented Dec. 21, 1920.
2 SHEETS—SHEET 1.
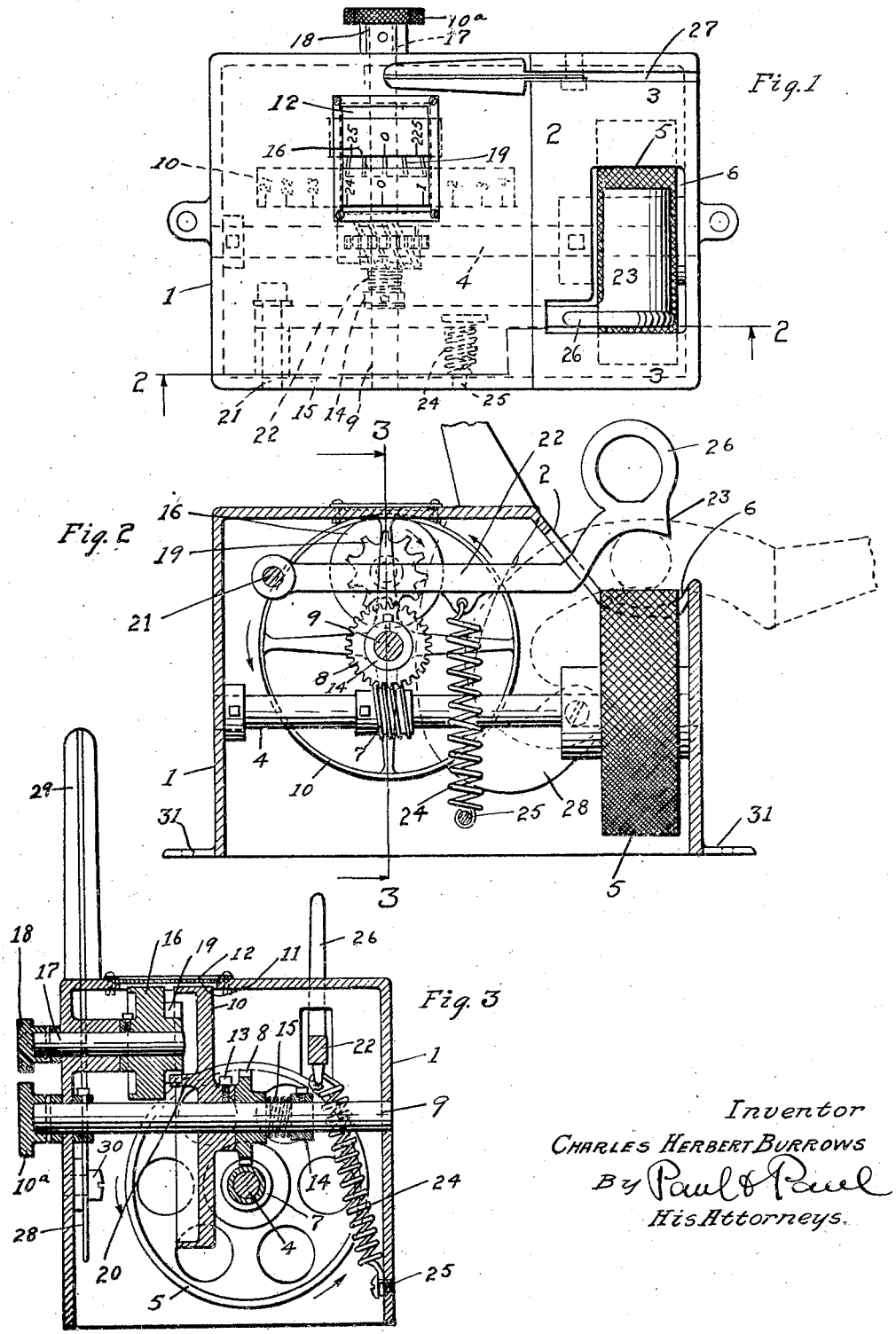
Inventor
CHARLES HERBERT BURROWS
By Paul & Paul
His Attorneys.

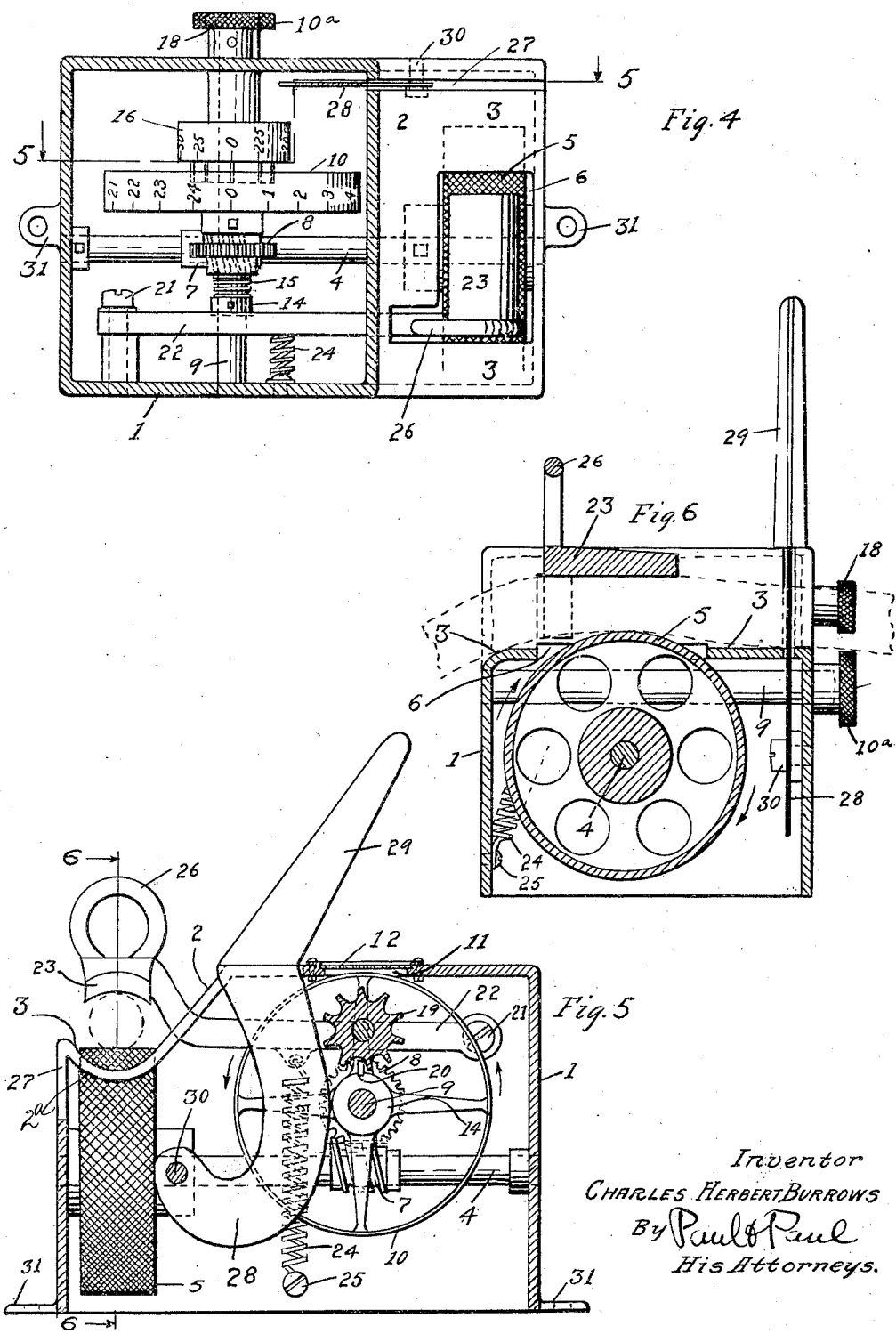

UNITED STATES PATENT OFFICE.

CHARLES HERBERT BURROWS, OF MINNEAPOLIS, MINNESOTA, ASSIGNOR TO ADOLPH NIKODYM, OF MINNEAPOLIS, MINNESOTA.

ROPE-MEASURING MACHINE.

1,362,843.  Specification of Letters Patent.  Patented Dec. 21, 1920.

Application filed February 2, 1920. Serial No. 355,647.

*To all whom it may concern:*

Be it known that I, CHARLES HERBERT BURROWS, a citizen of the United States, resident of Minneapolis, in the county of Hennepin and State of Minnesota, have invented certain new and useful Improvements in Rope-Measuring Machines, of which the following is a specification.

This invention relates to improvements in rope measuring machines, and the objects I have in view are to provide a small, inexpensive and compact machine that is particularly adapted for the use of retail merchants, and capable of being secured to a store counter or other support where it is in convenient position for use at any time, being also adapted for measuring rope of any ordinary size.

The invention consists generally in the constructions and combinations hereinafter described and particularly pointed out in the claims.

In the accompanying drawings forming part of this specification,

Figure 1 is a plan view of a machine embodying my invention,

Fig. 2 is a vertical section on the line 2—2 of Fig. 1, looking in the direction of the arrows, Fig. 3 is a vertical section on line 3—3 of Fig. 2 looking in the direction of the arrows, Fig. 4 is a plan view with the upper part of the casing in section so as to show the interior arrangement of the mechanism, Fig. 5 is a section on line 5—5 of Fig. 4, looking in the direction of the arrows, Fig. 6 is a section on line 6—6 of Fig. 5, looking in the direction of the arrow.

In all of the drawings, 1 represents the casing, which is preferably of substantially rectangular form, provided at one end with a sloping wall 2, curved at its lower portion thereby forming a curved guideway 2ª along which the rope to be measure is drawn (see Figs. 2 and 6). Mounted within the casing is a shaft 4 carrying a wheel 5 having preferably a roughened or serrated rim or periphery. This wheel projects upwardly through an opening 6 in the rope guide formed by the curved wall 2ª (see Figs. 5 and 6). This shaft is provided with a worm 7 that meshes with a pinion 8 on a cross or countershaft 9. The shaft 9 preferably projects through the front wall of the casing and is provided with a knob or head 10ª by means of which the shaft may be turned by the hand of the operator in either direction. The pinion 8 is mounted loosely on the shaft 9. Mounted upon the shaft 9 is an indicating wheel 10. The periphery of this wheel is arranged below an opening 11 in the top of the casing, this opening being covered, if preferred, by a glass or other transparent plate 12, which will exclude dust from the interior of the casing while permitting the numbers on the registering wheels to be read. The indicating wheel 10 is secured to the shaft 9 so as to rotate therewith at all times. Any suitable means may be employed for securing this wheel to the shaft. I have shown, and prefer to use, a set screw 13 in the hub of the wheel engaging the shaft and thereby locking the wheel and shaft together. A collar 14 is arranged on the shaft 9 and pinned thereto and a spring 15 is placed between the collar 14 and the hub of the pinion 8. This spring forces the opposite face of the pinion 8 against the hub of the indicating wheel 10, with sufficient force to cause said indicating wheel and the shaft 9 to be turned normally with the pinion 8.

A second indicating wheel 16 is mounted upon a short shaft 17 arranged in bearings in the wall of the casing. A knob 18 is provided on the end of the shaft 17 outside of the casing, permitting said wheel to be turned by the hand of the operator. The periphery of this wheel is arranged also below the opening 11 in the casing. The hub of the wheel 16 is preferably provided with ten teeth 19, (see Fig. 5), and the hub of the wheel 10 is provided with a lug or projection 20 adapted to engage the teeth 19 on the wheel 16, so that each revolution of the wheel 10 causes the wheel 16 to be moved one step, or one-tenth of a revolution. The wheel 10 is preferably marked to indicate the measurement of twenty-five feet of rope, and the wheel 16 indicates multiples thereof.

Mounted upon a pivot pin 21, arranged in the casing of the machine, is an arm 22 that extends through a slot in the inclined wall 2 of the casing and carries at its end a follower 23 having a curved under surface arranged directly over the upper surface of the wheel 5 (see Fig. 2). A spring 24 is connected to the arm 22, and to a screw 25 in the wall of the casing. This spring tends to draw the follower 23 downward toward the surface of the wheel 5 with yielding pressure. A ring 26 is preferably formed on the upper part of the follower 23 which enables the operator, by grasping said ring, to raise the follower away from the wheel 5 and against the tension of the spring 24.

The inclined wall 2 of the casing is preferably provided with a slot 27 that extends across the curved lower portion of said wall and down part way through the vertical wall of the casing as shown in Fig. 5 of the drawing. A curved knife 28 having an upwardly projecting handle 29 is pivoted at 30 on the inner wall of the casing and projects through the slot 27, as shown particularly in Figs. 1, 5 and 6 of the drawings. This knife, when swung upon its pivot, by means of the handle 29 shears across the rope-guide on the casing, and cuts through any rope held in said guide, the knife being moved in this operation from the position shown in full lines in Fig. 6 to the position shown by dotted lines in Fig. 2.

The casing is preferably provided with the lugs 31 having holes therein by means of which it may be fastened to a counter, table or other suitable support.

The operation of the device is as follows: The registering wheels being set at zero as indicated at Fig. 1 of the drawing, the operator grasps the ring 26 raising the follower 23 away from the wheel 5. He then places the end of the rope to be measured under the follower 23, and releasing said ring the follower is drawn against the rope by the spring 24 and presses the under side of the rope against the roughened surface of the wheel 5. The operator then pulls the rope along between the wheel and the follower, the wheel turning with the movement of the rope, and the amount of rope that is drawn forward being indicated by the wheels 10 and 16. When the desired amount of rope has been measured off the operator grasps the handle 29 of the knife 28 and swinging the knife forward from the position shown by full lines in Fig. 5 to the position shown by dotted lines in Fig. 2, cuts the rope. The rope is held by the follower, both during the measuring and the cutting operation.

To restore the wheels to zero the knobs 10 and 10ª are turned by the operator, the frictional contact between the pinion 8 and the hub of the wheel 10 permitting the wheel 10 to be turned without turning the pinion 8, the shaft 4 or the wheel 5.

The details of the structure may be varied in many particulars without departing from my invention.

I claim as my invention:

1. In a machine of the class described, the combination with a casing provided with a rope guide, of an operating wheel projecting into said rope guide, a movable arm projecting across said rope guide, a follower carried by said arm and arranged above said rope guide, and extending longitudinally of said guide, a spring engaging said arm and drawing said follower with yielding pressure toward said operating wheel, and indicating wheels arranged in said casing and connected with said operating wheel.

2. In a machine of the class described, the combination, with an inclosing casing provided with a rope guide extending across its surface and provided with an opening therein, of an operating wheel with its periphery projecting into said rope guide through said opening, indicating wheels connected with and arranged to be turned by said operating wheel, a follower arranged above said wheel and rope guide, and means moving said follower toward said wheel with yielding pressure.

3. In a machine of the class described, the combination, with the casing having a rope guide formed in its surface, with a slot extending through the wall of the casing across said guide, of an operating wheel projecting into said guide, a follower arranged to hold a rope against the surface of said operating wheel, and a knife pivoted in said casing and arranged to swing through said slot across said rope guide, whereby rope held in said guide and against said wheel by said follower may be severed by swinging said knife across said guide.

In witness whereof, I have hereunto set my hand this 28th day of January, 1920.

CHARLES HERBERT BURROWS.